(12) United States Patent
Giurlani

(10) Patent No.: US 10,029,381 B2
(45) Date of Patent: Jul. 24, 2018

(54) DEVICE FOR CONTROLLING THE SHARPENING STATE OF A BLADE

(71) Applicant: FUTURA S.P.A., Capannori (LU) Fraz. Guamo (IT)

(72) Inventor: Giovacchino Giurlani, Capannori (IT)

(73) Assignee: FUTURA S.P.A., Guamo (IT)

( * ) Notice: Subject to any disclaimer, the term of this patent is extended or adjusted under 35 U.S.C. 154(b) by 119 days.

(21) Appl. No.: 15/038,887

(22) PCT Filed: Oct. 30, 2014

(86) PCT No.: PCT/IT2014/000284
§ 371 (c)(1),
(2) Date: May 24, 2016

(87) PCT Pub. No.: WO2015/079466
PCT Pub. Date: Jun. 4, 2015

(65) Prior Publication Data
US 2017/0021521 A1 Jan. 26, 2017

(30) Foreign Application Priority Data

Nov. 30, 2013 (IT) ................................ FI2013A0292

(51) Int. Cl.
*B24B 49/00* (2012.01)
*B26D 7/12* (2006.01)
(Continued)

(52) U.S. Cl.
CPC .................. *B26D 7/12* (2013.01); *B24B 3/38* (2013.01); *B24B 3/46* (2013.01); *B24B 49/003* (2013.01);
(Continued)

(58) Field of Classification Search
CPC .. B24B 3/46; B24B 3/463; B24B 9/00; B24B 19/002; B24B 49/003; B24B 49/02;
(Continued)

(56) References Cited

U.S. PATENT DOCUMENTS 5,793,493 A * 8/1998 Lane ...................... G01B 11/24
356/613
6,332,375 B1 * 12/2001 Randl .................... B23D 63/12
76/37

(Continued)

FOREIGN PATENT DOCUMENTS

DE         23 59 227 A1    6/1974
DE    10 2006 019354 B3    7/2007
(Continued)

*Primary Examiner* — Timothy V Eley
(74) *Attorney, Agent, or Firm* — McGlew and Tuttle, P.C.

(57) ABSTRACT

Device for controlling the sharpening state of a blade (2) having a cutting edge (20) delimited by two sides (21, 22) converging towards a plane (X) that contains the cutting edge itself. The device comprises two control surfaces each of which is in contact with a corresponding side (21, 22) of said cutting edge (20) and is connected with at least one transducer (R1, R2, R4), which produces an electrical displacement signal (S1, S2; S4) proportional to a displacement of the control surface with respect to said plane (X). Furthermore, the device comprises a processing unit (E) that receives said displacement signals (S1, S2, S4) and compares them, emitting an error signal if the comparison produces a value that exceeds a predetermined limit. The processing unit is connected to means (101, 102) for supporting and moving sharpening means (100).

15 Claims, 7 Drawing Sheets

Figure 1:
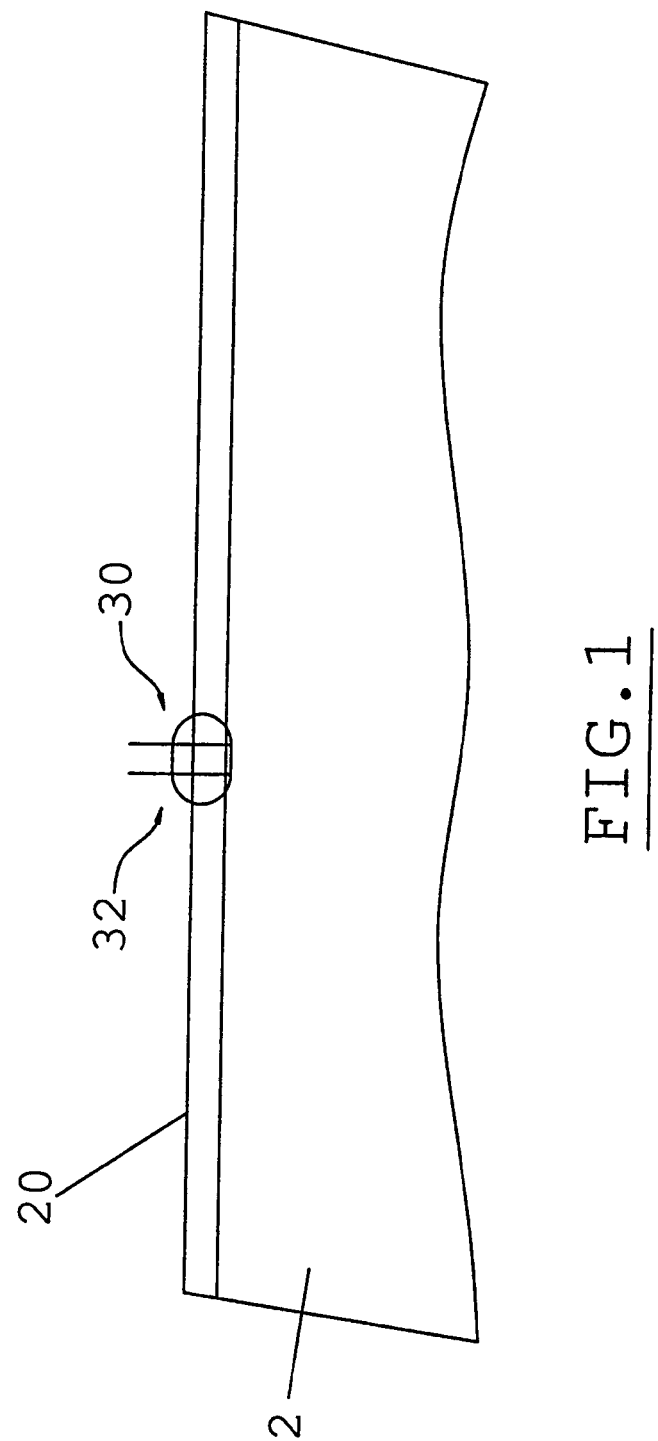

(51) Int. Cl.
*B24B 49/04* (2006.01)
*B24B 49/12* (2006.01)
*B24B 49/10* (2006.01)
*B26D 3/16* (2006.01)
*B24B 3/38* (2006.01)
*B24B 3/46* (2006.01)
*B26D 5/06* (2006.01)
*G01B 7/28* (2006.01)

(52) U.S. Cl.
CPC ............ *B24B 49/045* (2013.01); *B24B 49/10* (2013.01); *B24B 49/12* (2013.01); *B26D 3/16* (2013.01); *B24B 3/463* (2013.01); *B26D 5/06* (2013.01); *G01B 7/28* (2013.01)

(58) Field of Classification Search
CPC ....... B24B 49/04; B24B 49/045; B24B 49/10; B24B 49/12; B24B 51/00; B24D 15/06; B24D 15/063; B26D 1/14; B26D 7/12; G01B 7/28
See application file for complete search history.

(56) References Cited

U.S. PATENT DOCUMENTS

| | | | |
|---|---|---|---|
| 6,662,072 B2 * | 12/2003 | Berne | B24B 1/00 451/10 |
| 8,915,766 B1 * | 12/2014 | Kolchin | B24B 3/54 451/45 |
| 9,079,284 B2 * | 7/2015 | Christenson | B24B 3/54 |
| 9,393,662 B2 * | 7/2016 | Schroeder | B24B 3/40 |
| 2001/0029148 A1 * | 10/2001 | Knecht | B24B 3/36 451/11 |
| 2003/0019338 A1 * | 1/2003 | Berne | B24B 1/00 83/13 |
| 2007/0162255 A1 | 7/2007 | Chiu | |
| 2009/0077823 A1 | 3/2009 | Rattunde | |
| 2011/0281503 A1 * | 11/2011 | Knecht | B24B 3/54 451/5 |
| 2012/0118118 A1 * | 5/2012 | Casella | B26D 7/24 83/62.1 |
| 2012/0156964 A1 * | 6/2012 | Anderson | B24B 51/00 451/5 |

FOREIGN PATENT DOCUMENTS

EP  1 609 570 A1  12/2005
WO  2004/035273 A1  4/2004

* cited by examiner

DEVICE FOR CONTROLLING THE SHARPENING STATE OF A BLADE

The present invention relates to a device for controlling the sharpening state of band blades that can be used, in particular, for the production of paper rolls.

A conventional process for the production of paper rolls requires a rewinding machine by which a paper web is wound around a cardboard core to form an intermediate product, called "log", that is made by a paper roll obtained by winding the paper web around the cardboard tube and destined to be transversely cut to obtain shorter paper rolls, i.e. paper rolls that meet given commercial requirements.

The transverse cut of the logs is particularly critical. In fact, the cutting of the logs along planes that are not perfectly orthogonal to their longitudinal axis involves the formation of defective rolls, in which the side bases are oblique. This drawback is even more serious when the rolls are intended to be used in automatic dispensers which require, in fact, rolls with the side bases perfectly orthogonal to the axis of the rolls themselves, otherwise the rolls tend to get jammed in the dispenser.

The main object of the present invention is to provide a device that allows the elimination, or at least a great reduction, of the above-mentioned drawbacks.

This result is achieved, according to the present invention, by adopting the idea of realizing a device having the features indicated in claim 1 Other features of the invention are the subject of the dependent claims.

The present invention makes it possible to immediately check the sharpening state of the blade, checking the symmetry of the blade cutting edge and activating, when required, suitable sharpening means that can be directly or indirectly connected with the present device. Furthermore, the check is continuous and provides a check signal that can be used at any time. It is also noted that the checking process is essentially of mechanical nature, thus avoiding the negative influence of possible cutting residuals. Besides, the check does not provides negative effects on the operativeness of the checked machine. In addition, the present device can equip existing machines and can be integrated in existing production lines with relatively simple assembly operations. Further, the present device does not require major maintenance and keeps its characteristics basically unchanged even after prolonged use.

Figure 2:
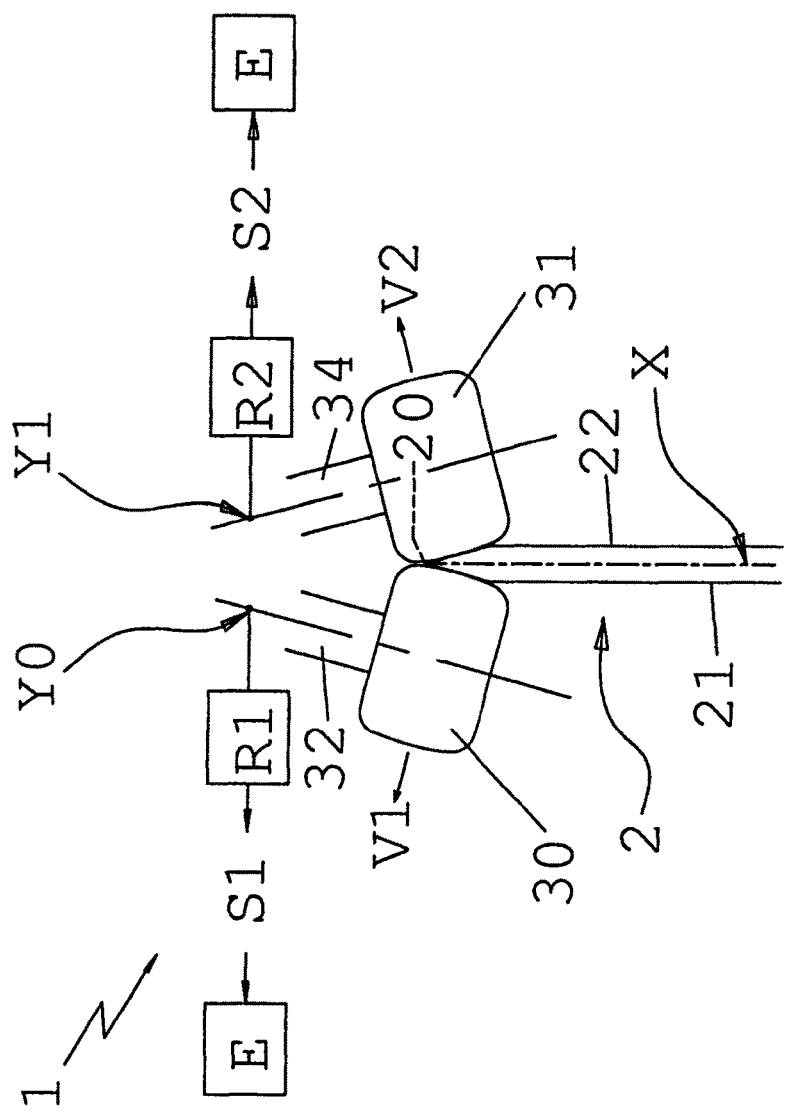
Figure 3:
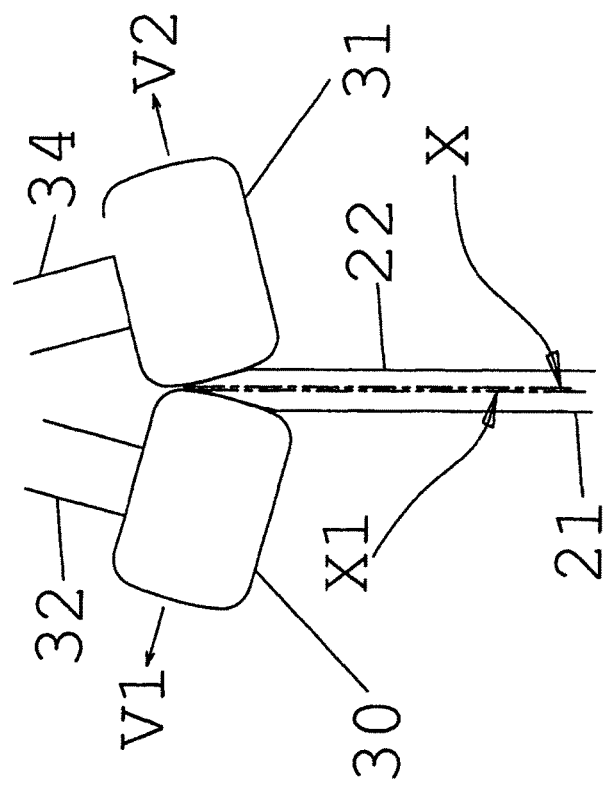
Figure 4:
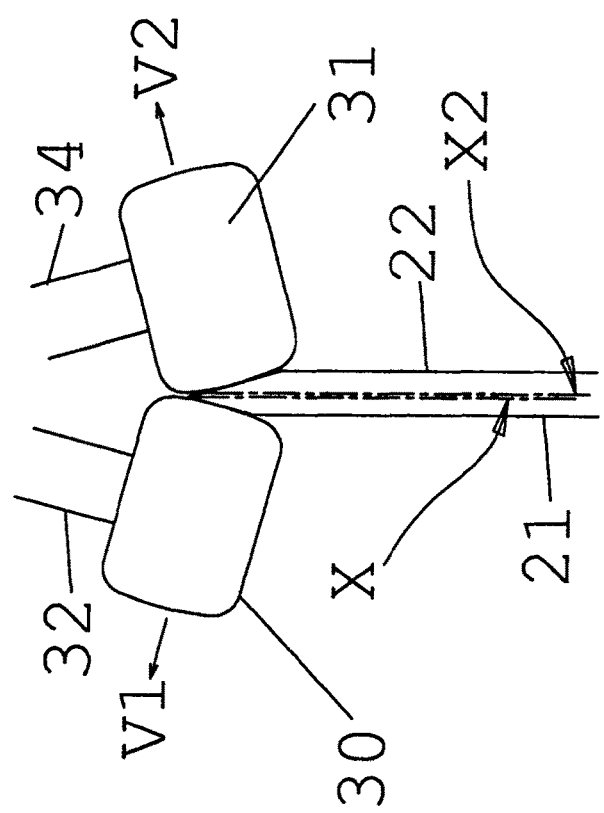
Figure 5:
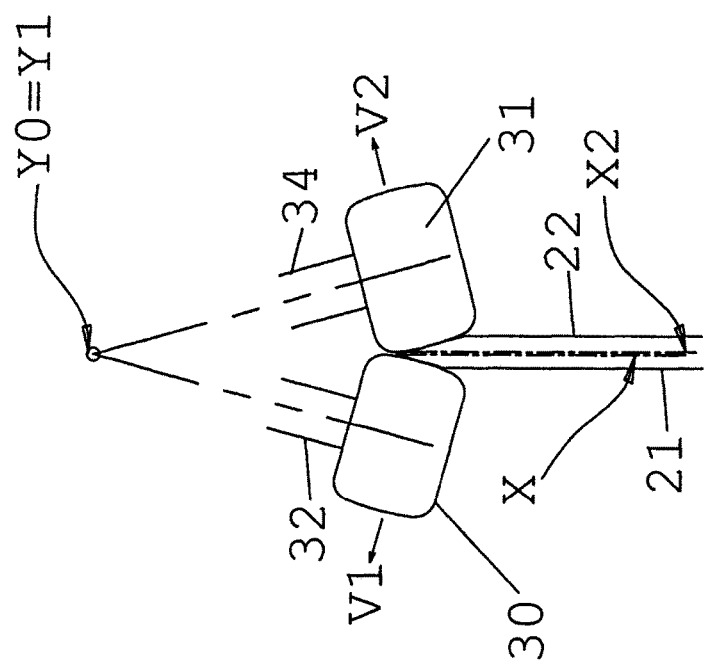
Figure 6:
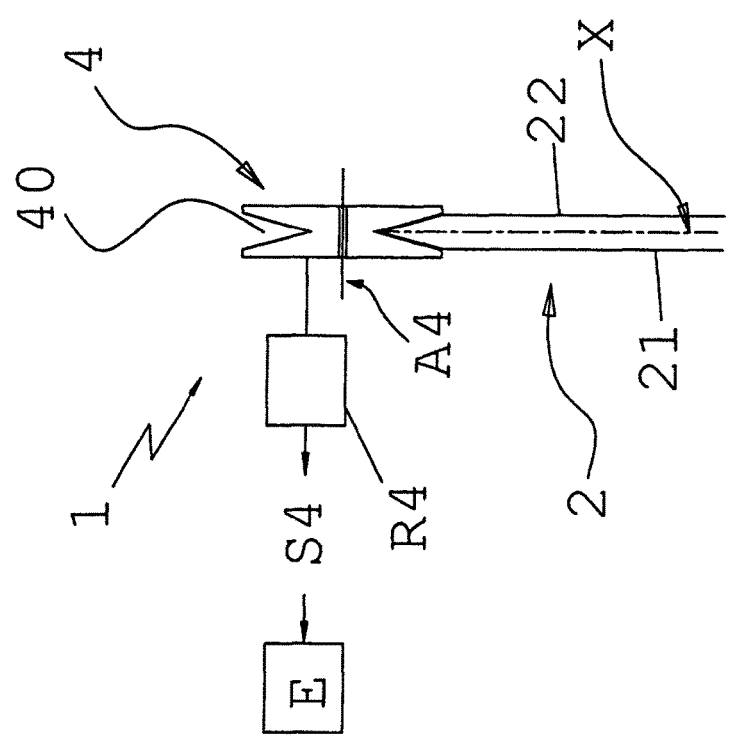
Figure 7:
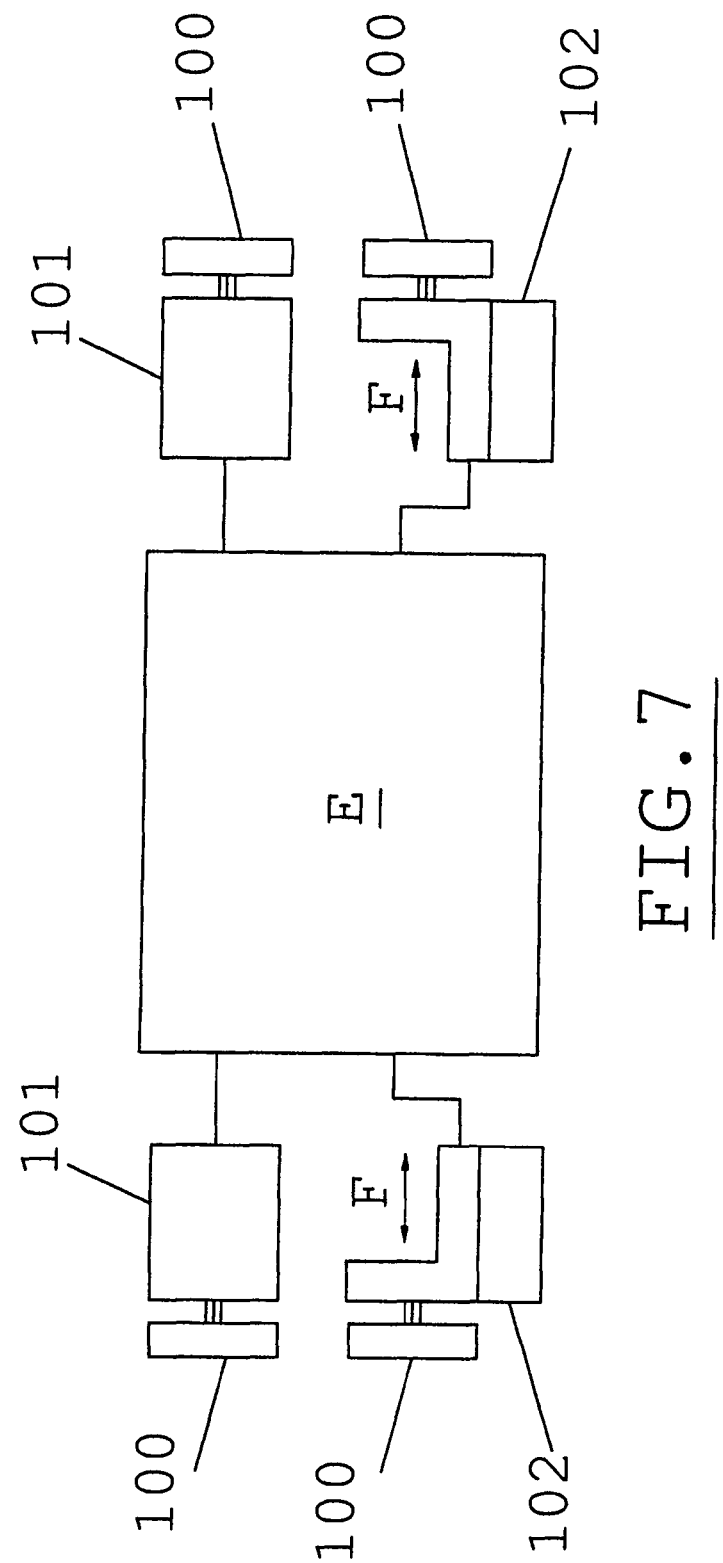

These and other advantages and features of the present invention will be best understood by anyone skilled in the art from the following description and with the help of the accompanying figures, given as a practical exemplification of the invention, but not to be considered in a limitative sense, in which:

FIG. 1 schematically shows a side view of a portion of a blade on which is arranged a control device in accordance with the present invention;

FIGS. 2, 3 and 4 schematically illustrate three possible operating conditions of the blade, represented in a partial cross section, with the control device shown for simplicity only in FIG. 2;

FIG. 5 schematically illustrates a further example of embodiment of a device according to the invention;

FIG. 6 schematically illustrates an alternative form of embodiment of a device in accordance with the present invention;

FIG. 7 schematically represents a possible operational implementation of a device in accordance with the present invention.

With reference to the attached drawings, a control device (1) according to the present invention is used to verify the correct sharpening of a band blade (2) formed by a laminar body provided with a sharp edge (20) delimited by two faces (21, 22) converging towards a plane in which the cutting edge lies.

The device shown in FIGS. 1-5 comprises two feeler probes (30, 31) arranged opposite to one another, in contact with the two sides of the cutting edge (20) so as to determine, as a function of the interaction of each probe (30, 31) with the blade (2), a signal (S1, S2) depending on the shape of the cutting edge (20). In practice, depending on the displacement of the two probes (30, 31) relative to the blade (20) (shown in the drawings with V1 and V2) it is possible to control the sharpening of the blade (20), or the symmetry of the cutting edge (20). Each of said probes (30, 31) is in contact with a correspondent side (20, 21) of the cutting edge (20).

In particular, said feeler probes (30, 31) are supported by respective arms (32, 34) that, in turn, are hinged about respective axes (Y0, Y1). The axes (Y0, Y1), that in FIGS. 2, 3, 4 are perpendicular the plane of the sheet, are parallel to each other and are on opposite sides with respect to the plane (X) where the sides (20, 21) of the cutting edge (20) converge.

In the drawings, the arms (32, 34) supporting the feeler probes are depicted schematically, as other parts described in the following.

As previously mentioned, each of the signals (S1, S2) produced by the movement of the feeler probes (30, 31) has a value corresponding to the displacement (V1, V2) of the same feeler probes (30, 31) relative to the blade (2).

According to a possible embodiment of the present invention, the present device comprises sensing means (R1, R2), i.e. detectors, for sensing the rotation of the arms (32, 34) about the respective axes (Y0, Y1) and electronic processing means apt to emit an error signal when there is the detection of discordant values between the amplitudes of the angles of rotation of the two feeler probes (30, 31). Each of said detectors (R1, R2) is a rotary encoder that measures the angle of rotation of the respective arm (32, 34) about the respective axis (Y0, Y1). Said signals (S1, S2) are electrical signals emitted by the transducers (R1, R2) and sent to the processing unit (E).

Each of said transducers (R1, R2) can be applied on the rotation axis (Y0, Y1) of the respective feeler probe (31, 32).

The error signal may be associated with an additional visual and/or acoustic signal.

When the blade (2) it is correctly sharpened, that is when the cutting edge (20) has a configuration suitable to achieve a correct cutting of the logs (or other material to be cut), the two feeler probes (30, 31) are equidistant from the blade (2), as shown in FIG. 2. In this case, the signals (S1, S2) emitted by the detectors (R1, R2) are equal to each other for the two sides of the cutting edge (20) as they correspond to equal angular displacements of the feeler probes (30, 31) and at equal displacements angle of the arms (32, 34) around the axes (Y0, Y1). In this case, the two sides of the cutting edge (20) are oriented symmetrically with respect to said plane (X) and no error signal is produced.

When the blade (2) does not exhibit a correctly sharpened edge, as in the examples of FIGS. 3 and 4, the signals (S1) and (S2) differ from each other and the device (1), by means of the unit (E), possibly taking into account a threshold value, emits an error signal used, for example, to command the intervention of means suitable to re-sharpen the blade (2) to bring it back to the optimal configuration (configuration in which the two sides of the cutting edge are oriented symmetrically with respect to the plane X). In addition, or alternatively, the error signal generated by the unit (E) can be used to control the emission of an alarm signal.

In FIGS. 3 and 4 along the vertical development of the blade (2) there are represented two additional axes (X1) and (X2) that indicate the incorrect configuration of the blade. In particular, in FIG. 3, the axis (X1) is to the left of the axis (X) and indicates a greater reduction of the left profile (face 21) of the cutting edge (20). Similarly, in FIG. 4 the axis (X2) is to the right of the axis (X) to indicate a greater reduction of the right profile (face 21) of the cutting edge (20).

In the examples shown in FIG. 2, FIG. 3 and FIG. 4 the aforementioned axes (Y0) and (Y1) are parallel to each other and not coincident.

In the example of FIG. 5 the arms (32, 34) of the two feeler probes are hinged on a same axis, i.e. the axes (Y0) and (Y1) are coincident.

Therefore, with reference to the examples shown in FIGS. 1-5, a control device according to the present invention, that can be used for checking the sharpening state of a blade having a cutting edge (20) delimited by two sides or faces (21, 22) converging towards a plane (X) containing the same cutting edge, comprises two control feeler probes (30, 31) each of which is in contact with a corresponding side (21, 22) of said cutting edge (20) and is connected with a respective transducer (R1, R2, R4), which produces an electrical displacement signal (S1, S2; S4) proportional to a displacement of the feeler probe with respect to said plane (X), and comprises a programmable electronic unit (E) that receives said displacement signals (S1, S2, S4) and compares them, emitting an error signal if the difference between the displacement signals exceeds a predetermined limit. According to the example shown in FIG. 6, the control device comprises a roller (4) with an external annular groove (40) in which passes the cutting edge (20) of the blade (2). The roller (4) is free to translate along an axis (A4) perpendicular to the plane (X) of the cutting edge (20). Preferably, the roller (4) is also free to rotate about said axis (A4).

In the example shown in FIG. 6, the roller (4) is associated with a lateral displacement detector (R4) constituted by a linear transducer which detects any displacement of the roller (4) to the right or to the left due to an asymmetric wear of the cutting edge (20). The signal (S4) is received by a programmable electronic unit (E) which emits an error signal (similarly to what is described above) if the absolute value of the signal, which can have positive or negative sign depending on whether the roller (4) moves towards the right or left, exceeds a predetermined limit.

With reference to all the examples described above, a device in accordance with the present invention comprises two control surfaces each of which is in contact with a corresponding side (21, 22) of said cutting edge (20) and is connected with at least one transducer (R1, R2; R4), which produces an electrical displacement signal (S1, S2, S4) proportional to a displacement of the control surface with respect to said plane (X), and comprises a programmable electronic processing unit (E) which receives the said displacement signals (S1, S2, S4) and processes them, emitting an error signal if the processing produces a value that exceeds a preset limit.

According to the first example, the control surfaces are the external surfaces of the feeler probes (30, 31) and the processing unit (E) produces an error signal if the difference between the values of the displacement signals (S1, S2) produced by the transducers (R1, R2) exceeds a given limit value. In the example described with reference to FIG. 6, the control surfaces are the surfaces that delimit the groove (40) of the roller (4) and the processing unit (E) emits an error signal if the absolute value of the displacement signal (S4) produced by the transducer (R4) is greater than a predetermined limit. For example, the roller (4) can be made of steel, coated with wear-resistant ceramic material. Said error signal can be used to control the automatic intervention of restoring means adapted to restore the sharpening of the blade. More particularly, the intervention of said restoring means can be activated/deactivated automatically when the absolute value of the error signal is greater/less than a predetermined reference value. For example, the restoration of the sharpening of the blade can be implemented by means of motorized grinding wheels (100) suitably arranged at the two sides of the blade, that is, by means of grinding wheels each of which is driven by a rotary actuator (101); by means of the actuators (101), the speed of rotation of the grinding wheels (100) is adjusted as long as the absolute value of the error signal is greater than the predetermined reference value.

Or, for example, if the grinding wheels (100) are grinding wheels each connected to a respective motorized slide (102), the restoration of the sharpening of the blade can be implemented by using the error signal for moving the motorized slides (102) adjusting the pressure exerted by the grinding wheels (100) on the two sides of the blade as long as the absolute value of the error signal is greater than the preset reference quantity as schematically indicated by the arrows "F" in FIG. 7.

The actuators (5) and the slides (6) are represented in the diagram of FIG. 7, in which, for simplification, both the actuators (5) and the slides (6) are connected to the unit (4), although, in general, in a sharpening device it is preferred to connect both grinding wheels to rotary actuators or to motorized slides.

The automatic restoration the blade sharpening can be selective in the sense that the left or the right grinding wheel (100) can be actuated depending on the sign, positive or negative, of the aforesaid error signal.

In practice, the details of execution may vary in any equivalent way as in the shape, dimensions, elements disposition, nature of the materials used, without leaving the scope of the adopted solution and thus remaining within the limits of the protection granted by this patent.

The invention claimed is:

1. A device for controlling a sharpening state of a blade having a cutting edge delimited by two sides converging towards a plane that contains the cutting edge, the device comprising:
    two control surfaces, each of said two control surfaces being configured to at least contact a corresponding side of said cutting edge and each of said control surfaces being connected with at least one transducer, which produces a signal proportional to a displacement of one of the control surfaces with respect to said plane to provide at least a plurality of displacement signals; and
    a programmable electronic unit that receives said displacement signals and compares said at least said plurality of displacement signals, said programmable electronic unit emitting an error signal if comparing said displacement signals produces a value that exceeds a predetermined limit and said programmable electronic unit being connected to a means for supporting and moving a sharpening means.

2. A device according to claim 1, wherein said control surfaces are outer surfaces of two feeler probes.

3. A device according to claim 2, wherein said feeler probes are hinged around two respective axes.

4. A device according to claim 3, wherein each of said rotary transducers is applied on a rotation axis of one of the feeler probes.

5. A device according to claim 4, wherein said respective axes are at least mutually parallel and opposite with respect to said plane and said respective axes are supported by respective arms.

6. A device according to claim 4, wherein said axes are coincident.

7. A device according to claim 3, wherein said respective axes are at least mutually parallel and opposite with respect to said plane and said respective axes are supported by respective arms.

8. A device according to claim 3, wherein said axes are coincident.

9. A device according to claim 2, wherein each of said transducers is a rotary encoder.

10. A device according to claim 1, wherein each of said transducers is a rotary encoder.

11. A device according to claim 10, wherein each of said transducers is applied on a rotation axis of one of a plurality of feeler probes.

12. A device according to claim 10, wherein axes are at least mutually parallel and opposite with respect to said plane and said axes are supported by respective arms.

13. A device according to claim 10, wherein axes are coincident.

14. A device according to claim 1, wherein said control surfaces are surfaces that delimit an external groove of a roller that is free to translate at least along an axis perpendicular to said plane and spaced from the blade by an amount such that said cutting edge passes in said external groove.

15. A device according to claim 1, wherein said error signal is associated with one or more of a light signal and an acoustic signal.

* * * * *